(12) United States Patent
Groenewold et al.

(10) Patent No.: US 12,471,964 B2
(45) Date of Patent: Nov. 18, 2025

(54) METHODS AND SYSTEMS FOR CORRECTING OR AMELIORATING SPINAL CURVATURE DEFORMITIES

(71) Applicant: ZachMed LLC, Tucson, AZ (US)

(72) Inventors: Wade Donald Groenewold, Tucson, AZ (US); Dalton Dorner Groenewold, Tucson, AZ (US)

(73) Assignee: ZachMed LLC, Tucson, AZ (US)

( * ) Notice: Subject to any disclaimer, the term of this patent is extended or adjusted under 35 U.S.C. 154(b) by 1160 days.

(21) Appl. No.: 17/345,498

(22) Filed: Jun. 11, 2021

(65) Prior Publication Data

US 2022/0395302 A1 Dec. 15, 2022

(51) Int. Cl.
*A61B 17/70* (2006.01)

(52) U.S. Cl.
CPC ...... *A61B 17/7077* (2013.01); *A61B 17/7086* (2013.01)

(58) Field of Classification Search
CPC ............ A61B 17/7077; A61B 17/7086; A61B 17/7088
See application file for complete search history.

(56) References Cited

U.S. PATENT DOCUMENTS

| | | | |
|---|---|---|---|
| 3,675,897 A | 7/1972 | Smith | |
| 4,957,495 A * | 9/1990 | Kluger | A61B 17/7077 606/264 |
| 5,385,565 A | 1/1995 | Ray | |
| 6,530,929 B1 * | 3/2003 | Justis | A61B 17/88 606/264 |
| 6,565,568 B1 | 5/2003 | Rogozinski | |
| 2004/0147936 A1 * | 7/2004 | Rosenberg | A61B 17/7086 606/99 |
| 2005/0033291 A1 | 2/2005 | Ebara | |
| 2006/0009775 A1 * | 1/2006 | Dec | A61B 17/7088 606/86 R |
| 2006/0025768 A1 * | 2/2006 | Iott | A61B 17/7076 606/86 A |
| 2006/0166535 A1 * | 7/2006 | Brumfield | B25B 7/18 439/179 |
| 2007/0276379 A1 * | 11/2007 | Miller | A61B 17/7088 606/86 A |
| 2008/0228233 A1 * | 9/2008 | Hoffman | A61B 17/7088 606/86 A |
| 2009/0216237 A1 * | 8/2009 | Frezal | A61B 17/7077 606/90 |
| 2017/0273723 A1 | 9/2017 | Barry | |
| 2018/0049774 A1 | 2/2018 | Farmer et al. | |

* cited by examiner

*Primary Examiner* — Nicholas W Woodall
(74) *Attorney, Agent, or Firm* — NGUYEN TARBET IP LAW

(57) ABSTRACT

Methods and systems for axial spinal derotation for ameliorating or correcting aberrant spinal column deviations, such as but not limited to those associated with scoliosis. The systems and methods help facilitate the application of significant derotational forces to individual vertebrae and posterior elements. The present invention describes a two-piece system comprising a pivot tool with a handle and a saddle reducer, e.g., a temporary rod. The systems herein can replace more complex systems for axial spinal derotation. The systems have the advantage of axial rotation off of one rod instead of two.

17 Claims, 13 Drawing Sheets

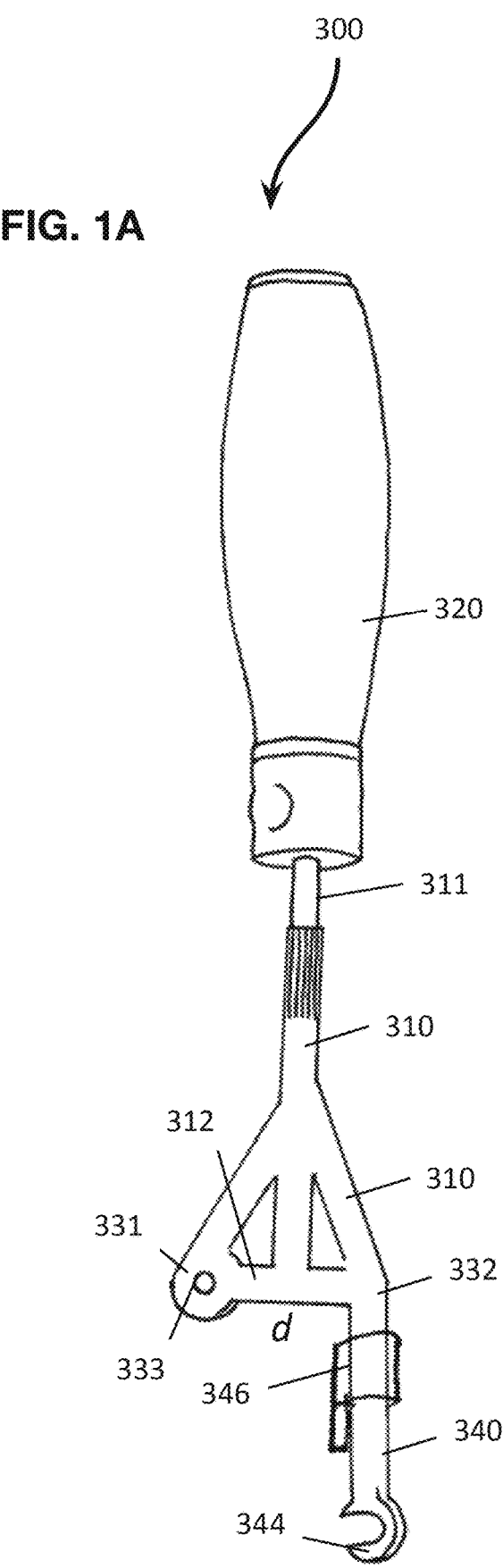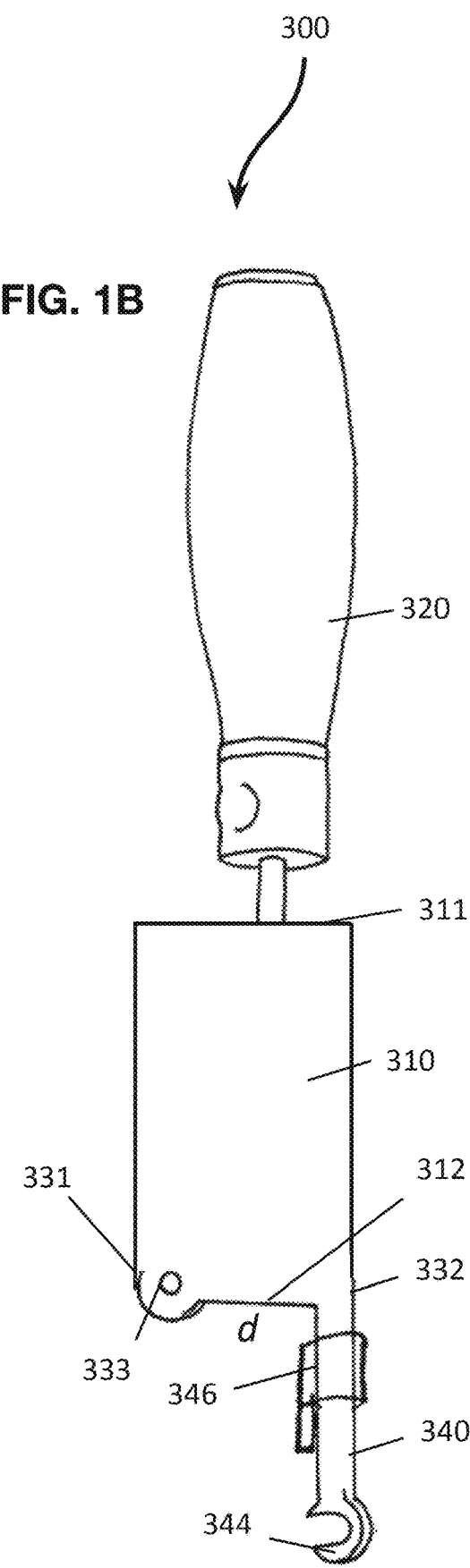
FIG. 1A
FIG. 1B

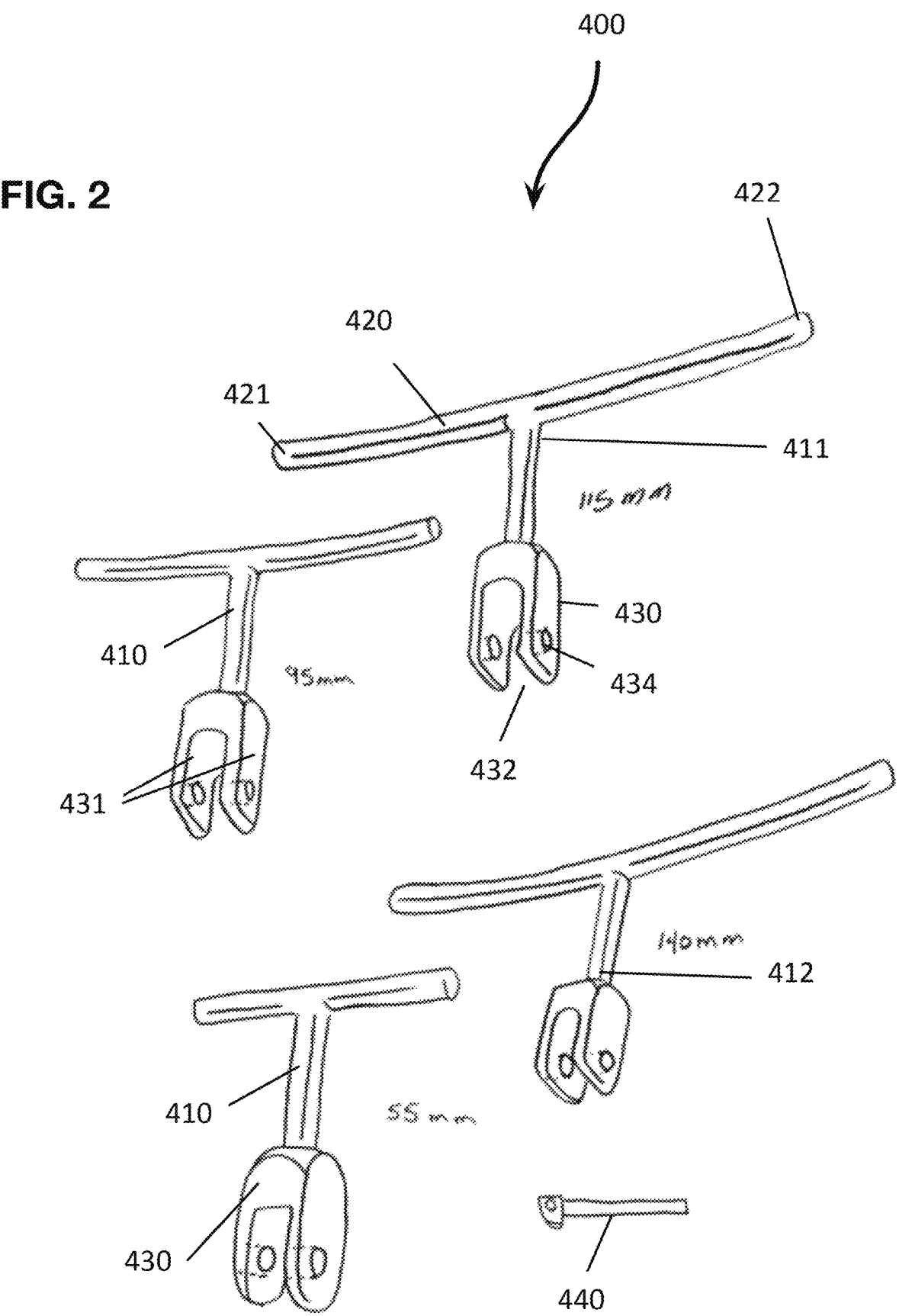

FIG. 5A
FIG. 5B
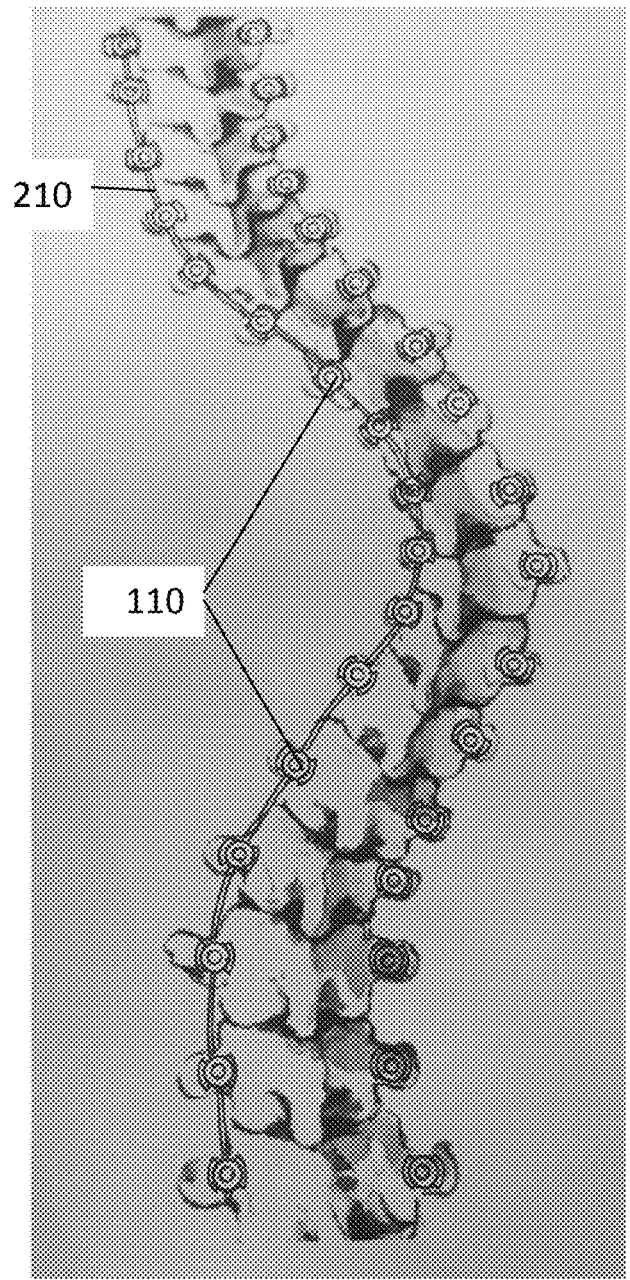
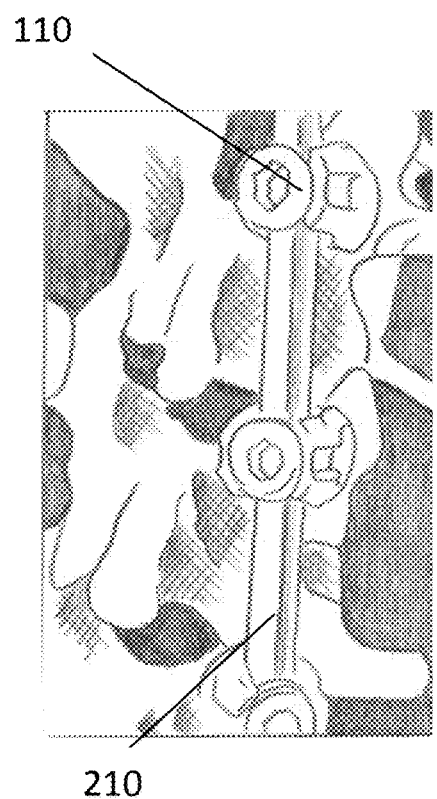

METHODS AND SYSTEMS FOR CORRECTING OR AMELIORATING SPINAL CURVATURE DEFORMITIES

BACKGROUND OF THE INVENTION

Field of the Invention

The present invention relates to methods and systems for derotation of the spine, for example for the purpose of correction of spinal curvature deformities in the axial, coronal, and/or sagittal planes.

Background Art

Surgical deficiencies currently exist in the methodology and instrumentation for treating spinal deformities, such as scoliosis, in the axial, coronal and sagittal plane. These surgical deficiencies generally occur when a surgeon attempts to perform direct vertebral rotation (DVR) (or direct vertebral derotation (DVD)) in the axial plane intraoperatively after correcting the deformed spine in the coronal and sagittal planes.

DRV methods feature the implantation of pedicle screws such as mono screws (e.g., a fixed screw and head) or uniplanar screws (e.g., a pedicle screw where the head of the screw moves only in the cephalad or caudal direction of the spine) in the vertebral body and pedicle bone. Bilateral rods are then placed in the screw heads and set caps capture the rods in the screw heads. Current DRV methods for correction in the axial plane, such as those described in U.S. Pat. No. 7,670,358, may require multiple shafts with handles (e.g., towers) and wrenches or rails to be placed over and connected to the heads of the individually placed pedicle screws in the pedicle bones. The shafts with handles connected to the pedicle screw heads can then have forces applied bilaterally or clustered left to right (or vice versa) in segments. In some cases, multiple shafts and handles are clustered en bloc using clamps and/or wrenches. Then, the shafts with handles and wrenches can be pulled or pushed right or left (or vice versa) to help correct the spine in the axial plane. Once the correction of the vertebral bodies and posterior elements is achieved in the axial plane, the set caps that captured the pedicle screws to the rods are tightened and torqued to hold the corrected spine in place until bone remodeling takes place and the spinal segments are fused together.

The extreme forces applied to the individual pedicle screws with the shafts and handles individually or in a cluster may cause the pedicle screw/s to pull out of the pedicle or to loosen during the derotation procedure, especially when performing axial correction and DVR in adult deformity corrections where bone quality resulting from osteoporosis or osteopenia is present. The amount of stress transferred to the individual pedicle screws placed in the pedicle bone is significant enough to pull the pedicle screws out of the pedicle (or loosen the screw in the pedicle bone) or create stress shielding that can loosen the bone screw interface and create a pseudoarthrosis later when the spinal segments are attempting to fuse together.

In view of the current methods used in the art, it is the object of the present invention to provide improved systems and methods for use in correcting or ameliorating aberrant spinal column deviation conditions (such as but not limited to scoliosis) in the axial, sagittal, and coronal planes.

While other methodology and instruments in the art derotate the pedicle screws bilaterally off of two rods, limiting rotational correction in the axial plane, the present invention allows for the rotation and pivoting of the vertebral bodies and posterior elements using one center of rotation (e.g., derotation/pivoting off of one rod), creating the ability of full axial correction.

Without wishing to limit the present invention to any theory or mechanism, it is believed that the present invention is associated with a reduced risk of pedicle fracture, a reduced risk of pedicle screw pullout, and a reduced pedicle screw stress shielding in the pedicle bone on the concave, convex and axial planes of the spine. This may be achieved because forces are believed to be distributed evenly over multiple pedicle screw fixation points in the pedicle bone linked via the rod (and thus also distributed evenly over the pedicle bone) while the rotation maneuver is performed to correct the deformity in the axial plane.

BRIEF SUMMARY OF THE INVENTION

The present invention features methods and systems for axial spinal derotation (also referred to as direct vertebral rotation (DVR) or direct vertebral derotation (DVD)) for ameliorating or correcting aberrant spinal column deviations, such as but not limited to those associated with scoliosis. The systems and methods help facilitate the application of significant derotational forces to individual vertebrae and posterior elements of the spine.

Without wishing to limit the present invention to any theory or mechanism, it is believed that the present invention may be used to replace current systems that feature towers, rails, and en bloc derotation.

Without wishing to limit the present invention to any theory or mechanism, it is believed that the present invention is advantageous because it allows for a single pivot point and pivoting (correction) off of a single rod. For example, forces on the concave side are evenly distributed because the force is on a single rod (the saddle reducer) and its respective pedicle screws. Forces on the concave screws implanted in the pedicles and vertebral bodies are equally distributed along the length of the concave rod as the forces are applied to the convex pedicle screw saddles implanted in the pedicles and vertebral bodies with a downward motion with a predetermined length temporary rod causing the saddles of the screws on the concave side to pivot around a single rod forcing the spine to neutral or corrected position in the axial plane.

Without wishing to limit the present invention to any theory or mechanism, it is believed that the systems and methods of the present invention are advantageous because they make the derotation procedure easier, e.g., there is significantly less physical force required to derotate the spine as compared to previous systems and methods. For example, the amount of force required to derotate or rotate and correct the deformed spine in the axial plane is significantly less when performing the axial correcting off of one pivot rod in the present invention instead of two rods as in U.S. Pat. No. 7,670,358.

Without wishing to limit the present invention to any theory or mechanism, it is believed that the systems and methods of the present invention are advantageous because the tools are simple to use and allow for a dramatic reduction in the time needed to perform a derotation procedure.

Without wishing to limit the present invention to any theory or mechanism, it is believed that the systems of the present invention are advantageous because they work with a variety of different types of pedicle screws. Notably, the systems of the present invention do not require mono or uniplanar pedicle screws can be used exclusively with polyaxial pedicle screws which creates much less stress shielding of the pedicle screw placed into the pedicle bone than when using traditional systems with uniplanar pedicle screws or mono pedicle screws. For example, pedicle screws can be hard to line up perfectly. Using traditional derotation systems, the screws may have to be manipulated to adjust to the rod, therefore adding stress. Using the systems of the present invention, the pedicle screws don't have to line up perfectly or be stable for the systems to work. The force pushes directly on the bone itself; thus, there is less chance of a screw loosening or pulling out. The DVR instrument can be used with only polyaxial screws (if desired), which creates significantly less stress shielding of the screw-pedicle bone interfaces. When the rod is introduced into the saddles of the screws, the polyaxial head of the saddle allows for the imperfect placement of the screws in the pedicle bone and vertebral body and vastly decreases stresses on the screw pedicle bone interface in all planes. Polyaxial screws allow the screws to reach and maintain equilibrium in the pedicle bone when the rod is attached, vastly decreasing the possibility of screw loosing or pulling out as the bone remodels and eventually fuses together.

As is described herein, the present invention features a method of correcting or ameliorating a spinal deformity in at least an axial plane. In some embodiments, the method comprises temporarily attaching a handle of a derotation system to a rod captured by a first column of pedicle screws; temporarily engaging a temporary rod of a derotation system in a second column of pedicle screws opposite the first column; temporarily connecting the handle to the temporary rod; and applying pressure to the handle of the derotation system and producing downward pressure on the pedicle screws capturing the temporary rod which thereby derotates vertebral bodies and posterior segmental elements to a neutral or normal corrected position. In some embodiments, rotation of vertebral bodies is achieved by a single temporary rod placed in pedicle screws of the concave curve.

In some embodiments, the method is for three-dimensional correction or amelioration of a spinal deformity. In some embodiments, the method is for correction or amelioration of a scoliosis deformity. In some embodiments, the method is for correction or amelioration of a main thoracic, double thoracic, double major, triple major, thoracolumbar/lumbar, a thoracolumbar, or a lumbar-main thoracic scoliosis deformity.

In some embodiments, the method further comprises correcting coronal and sagittal plane deformities prior to axial derotation. In some embodiments, the temporary rod is configured to engage polyaxial tulip head pedicle screws. In some embodiments, the temporary rod is configured to engage mono or uniplanar pedicle screws.

In some embodiments, the method further comprises the use of a second derotation system. In some embodiments, the method further comprises the use of a third derotation system. In some embodiments, the method further comprises temporarily attaching a handle of a second derotation system to the rod captured by a first column of pedicle screws; temporarily engaging a temporary rod of a second derotation system in a second column of pedicle screws opposite the first column; and temporarily connecting the handle to the temporary rod. In some embodiments, the second derotation system is used as a counter torque. In some embodiments, the handles of the first and second derotation systems are moved in opposite directions.

In some embodiments, the method further comprises disconnecting the handle and temporary rod; detaching the handle of the derotation system from the rod; and detaching the temporary rod from the second column of pedicle screws.

As is described herein, the present invention also features a derotation system for correcting a spinal deformity in at least an axial plane. In some embodiments, the system comprises a pivot tool comprising a base with a hook disposed thereon in a first position and a first attachment component disposed thereon in a second position, the hook is configured to temporarily attach to a rod; and a saddle reducer comprising an engagement rod for temporarily engaging pedicle screws and a second attachment component extending from the engagement rod, wherein the pivot tool and saddle reducer can be temporarily connected together by engaging the first attachment component with the second attachment component.

In some embodiments, the system further comprises a handle extending from the base of the pivot tool. In some embodiments, the system further comprises two handles extending from the base of the pivot tool. In some embodiments, the two handles are at an angle a with respect to each other.

In some embodiments, the pivot tool comprises an attachment sleeve for temporarily securing the hook to a rod, wherein the attachment sleeve can move between an engaged position and a disengaged position. In some embodiments, the hook is connected to the base via a hook extension. In some embodiments, the first position of the base and the second position of the base are spaced a distance d apart.

In some embodiments, the first attachment component of the pivot tool comprises a pinhole component adapted to accept a pin. In some embodiments, the second attachment component of the saddle reducer comprises a pinhole component adapted to accept a pin. In some embodiments, the second attachment component of the saddle reducer connects to the engagement rod via a base shaft. In some embodiments, the second attachment component comprises a pinhole for accepting a pin. In some embodiments, the pinhole component and pinhole can be secured together to connect the pivot tool to the saddle reducer. In some embodiments, the pinhole component and pinhole can be secured together via a pin. In some embodiments, the second attachment component of the saddle reducer comprises a hinge attached (e.g., permanently or temporarily) to the pivot tool.

In some embodiments, the engagement rod is from 20 to 150 mm in length. In some embodiments, the engagement rod is from 50 to 160 mm in length.

In some embodiments, the engagement rod can be captured by one or more pedicle screws. In some embodiments, the engagement rod can be captured by two or more pedicle screws. In some embodiments, the engagement rod can be captured by three or more pedicle screws.

In some embodiments, the system corrects a spinal deformity in coronal, sagittal, and axial planes. In some embodiments, the system also corrects a spinal deformity in a coronal and sagittal plane.

The present invention also features a kit comprising a system according to the present invention. In some embodiments, the kit further comprises at least one pedicle screw. In some embodiments, the kit further comprises at least one rod.

The present invention also features a method of correcting or ameliorating a spinal deformity in at least an axial plane. In some embodiments, the method comprises (using a system according to the present invention), temporarily attaching the pivot tool to a rod captured by a first column of pedicle screws; temporarily engaging an engagement rod of the saddle reducer in a second column of pedicle screws opposite the first column; temporarily connecting the pivot tool to the engagement rod; and applying pressure to the pivot tool and producing downward pressure on the pedicle screws capturing the saddle reducer, which thereby derotates vertebral bodies and posterior segmental elements to a neutral or normal corrected position.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIG. 1A, FIG. 1B, FIG. 1C, FIG. 1D, FIG. 1E, FIG. 1F, and FIG. 1G show non-limiting examples of pivot tools.

FIG. 2 shows non-limiting examples of saddle reducers.

FIG. 5A and FIG. 5B show an example of a rod engaged in pedicle screws on the concave side of the deformity, e.g., at least covering the apex of the deformity.

DETAILED DESCRIPTION OF THE INVENTION

Figure 1C:
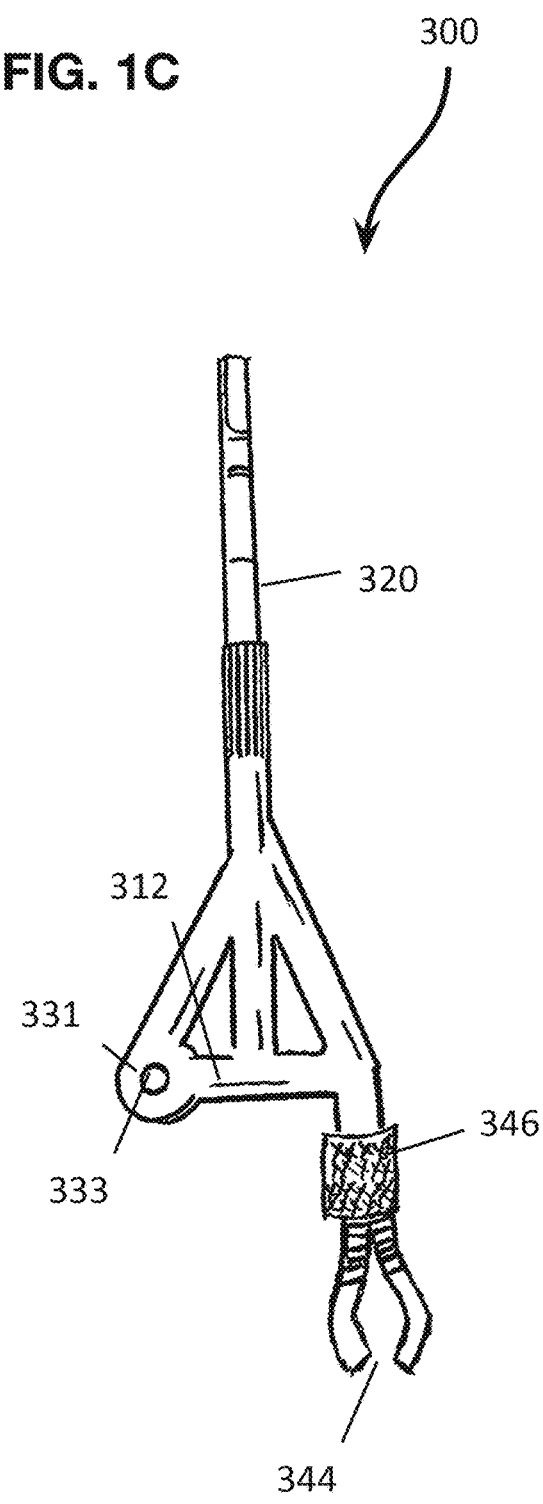

The present invention provides methods and systems for derotation of the spine, which may also be referred to as direct vertebral rotation (DVR) or direct vertebral derotation (DVD). The methods and systems of the present invention allow for correction of spinal deformities in the axial plane. Non-limiting examples of spinal deformities include scoliosis, kyphosis, and lordosis. As such, the present invention provides methods and systems for rotation of the spine in the coronal plane, sagittal plane, and axial plane. Without wishing to limit the present invention to any theory or mechanism, it is believed that the methods and systems of the present invention provide for an improved system of spinal instrumentation for ameliorating aberrant spinal column deviation conditions.

As used herein, the terms "rotation" and "derotation" may be used interchangeably. As used herein, the terms "direct vertebral rotation" and "direct vertebral derotation" may be used interchangeably.

Systems: Pivot Tools and Saddle Reducers

The present invention provides systems and devices (e.g., instruments) for performing the DVR in the axial plane.

FIG. 1A, FIG. 1B, FIG. 1C, FIG. 1D, and FIG. 1E show non-limiting examples of pivot tools (300). FIG. 2 shows non-limiting examples of saddle reducers (400). The pivot tool (300) can be removably attached to a saddle reducer (400), and the attachment can be secured via an engagement component such as a pin.

Referring to FIG. 1A, FIG. 1B, FIG. 1C, FIG. 1D, FIG. 1E, FIG. 1F, and FIG. 1G, the pivot tool (300) comprises a base (310) having a proximal end (311) and a distal end (312). In certain embodiments, a handle (320) is disposed at the proximal end (311) of the base (310), e.g., a handle (320) may extend outwardly from the proximal end (311) of the base (310). In certain embodiments, two handles are disposed at the proximal end (311) of the base (310), e.g., two handles (e.g., a first handle (320a) and a second handle (320b)), may extend outwardly from the proximal end (311) of the base (310). In certain embodiments, three or more handles are disposed at the proximal end (311) of the base (310).

Figure 1D:
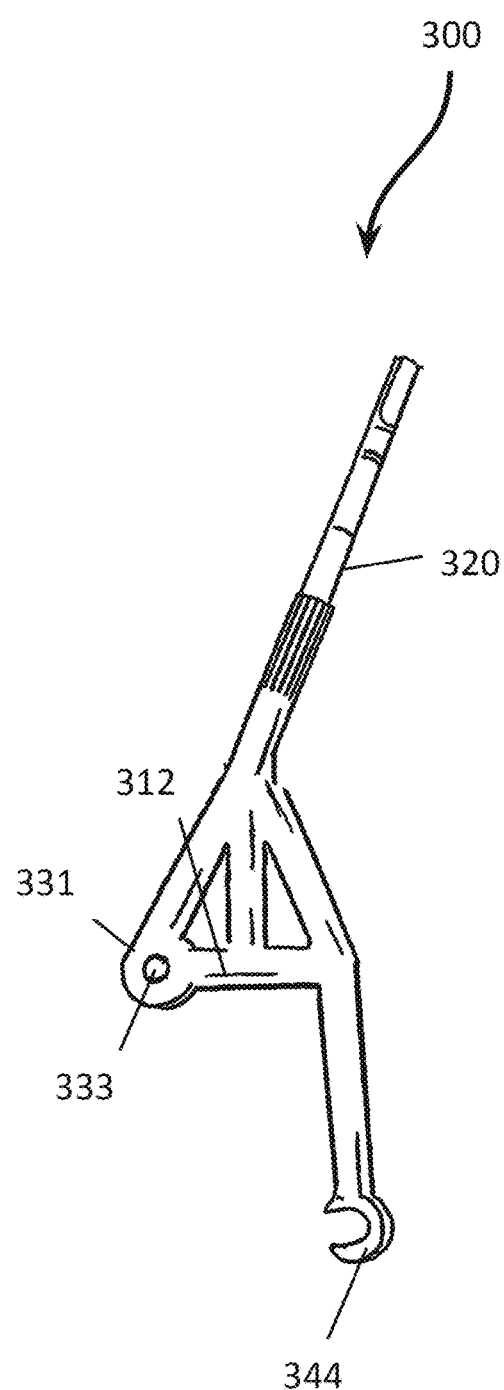
Figure 1E:
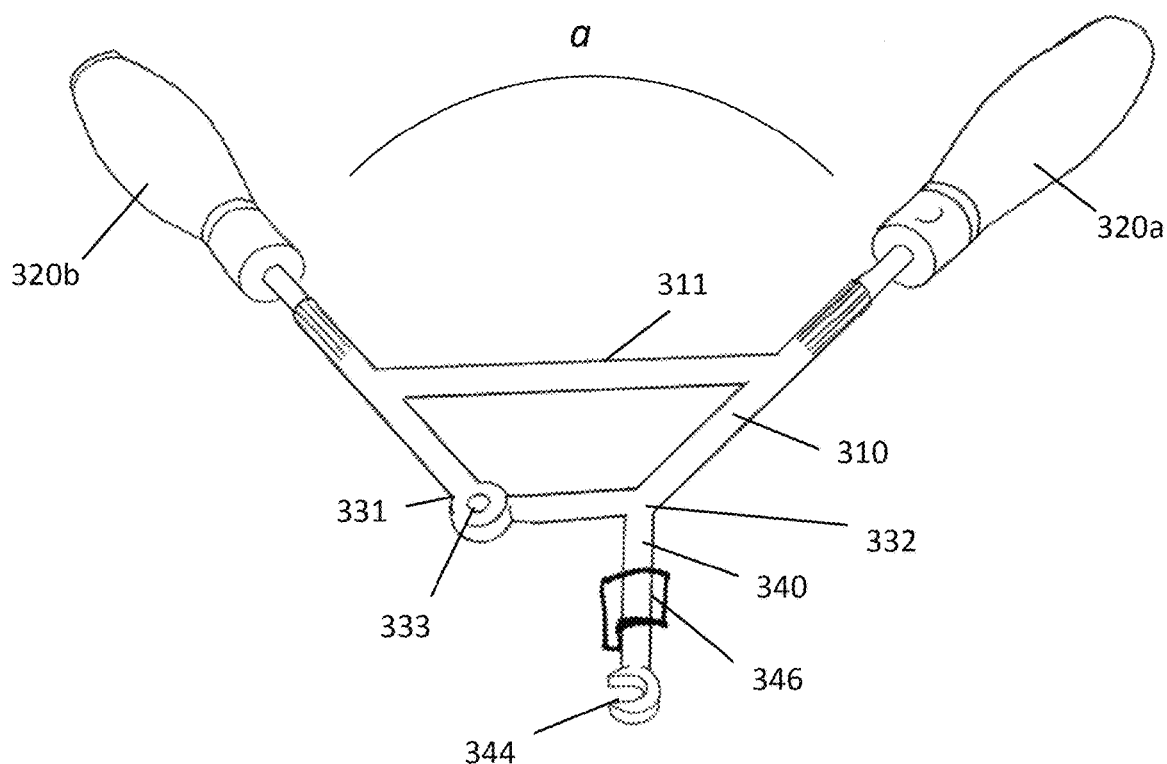
Figure 1F:
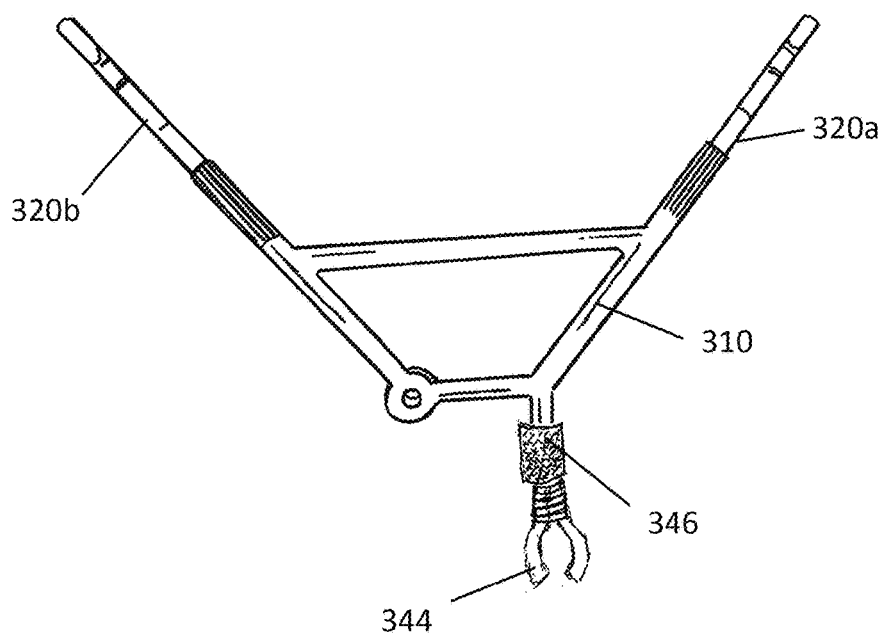
Figure 1G:
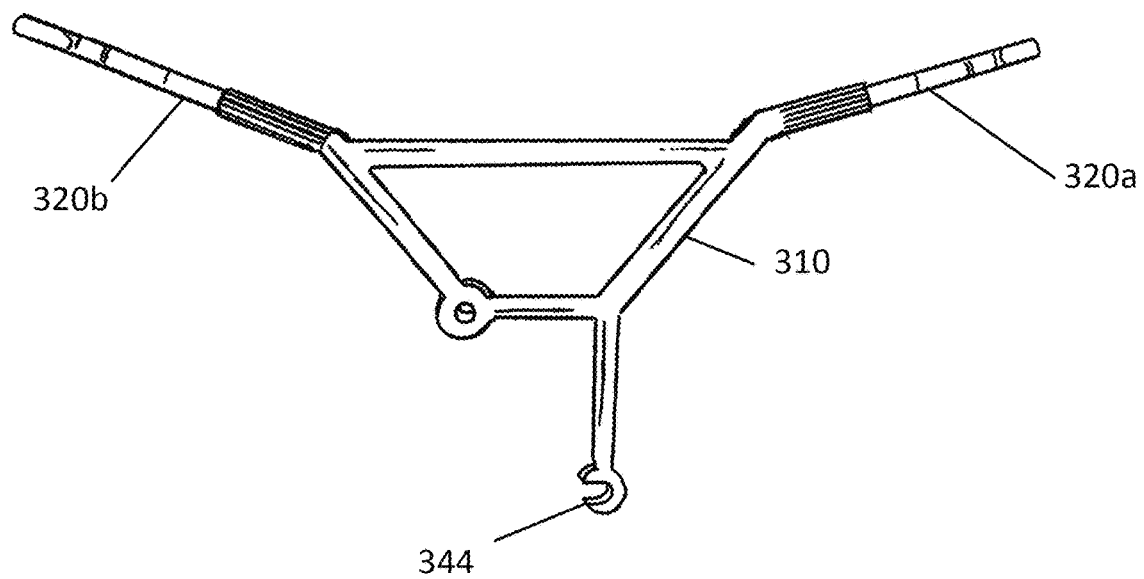

As shown in FIG. 1E and FIG. 1F, the handles (320a, 320b) may extend outwardly from the base (310) at an angle with respect to each other, e.g., angle a. In certain embodiments, angle a is 0, e.g., the handles are parallel. In certain embodiments, the angle a is from 0 to 10 degrees. In certain embodiments, the angle a is from 0 to 15 degrees. In certain embodiments, the angle a is from 15 to 30 degrees. In certain embodiments, the angle a is from 30 to 45 degrees. In certain embodiments, the angle a is from 45 to 60 degrees. In certain embodiments, the angle a is from 60 to 75 degrees. In certain embodiments, the angle a is from 75 to 90 degrees. In certain embodiments, the angle a is from 90 to 105 degrees. In certain embodiments, the angle a is from 105 to 120 degrees. In certain embodiments, the angle a is from 120 to 135 degrees. In certain embodiments, the angle a is from 135 to 150 degrees. In certain embodiments, the angle a is from 150 to 165 degrees.

The pivot tool (300) further comprises a pinhole component (333) for accepting a pin or other engagement component. In some embodiments, the pinhole component (333) is disposed at a first point (331) of the distal end (312) of the base (310). For example, the pinhole component (333) is disposed in or near the distal end (312) of the base (310). The present invention is not limited to this configuration. In some embodiments, the pinhole component (333) is instead connected to the first point (331) of the distal end (312), e.g., a prong may extend from the first point (331) of the distal end (312) and the pinhole component (333) is within the prong.

The pivot tool (300) further comprises a hook extension (340) with a hook (344) for hooking onto a rod. In some embodiments, the hook extension (340) is disposed at a second point (332) of the distal end (312) of the base (310). In some embodiments, the hook extension (340) extends outwardly from the second point (332) of the distal end (312) of the base (310). The hook (344) is disposed on the distal end of the hook extension (340). In some embodiments, the hook (344) is a traditional hook as shown in FIG. 1D. In some embodiments, the hook (344) comprises a pincher as shown in FIG. 1E. In some embodiments, the hook extension (340) has a shaft or rod configuration as shown. However, the present invention is not limited to this configuration.

Disposed on the hook extension (340) is an attachment sleeve (346). The attachment sleeve (346) can move between an engaged position wherein the attachment sleeve (346) secures the hook (344) (e.g., hook, pincher) to the rod (210) and a disengaged position wherein the hook (344) can be disengaged from the rod (210). The attachment sleeve (346) is not limited to the particular configuration shown and disclosed herein. In some embodiments, as shown in FIG. 1F, the attachment sleeve (346) comprises a coupling nut or variation thereof that when moved to the engaged position compresses the pincher together to secure the rod therein.

In certain embodiments, the length of the hook extension (340), e.g., from the point it joins or attaches to the base (310) to the distal end with the hook (344) is adjustable via an extension mechanism. Extension mechanisms for modifying the length of a bar or rod are well known to one of ordinary skill in the art.

The pinhole component (333) and hook extension (340) are spaced a distance apart a particular distance, e.g., distance d. In certain embodiments, the distance d is from 0.5 to 1.0 inches. In certain embodiments, the distance d is from 1.0 to 3.0 inches. In certain embodiments, the distance d is from 1 to 5 inches. In some embodiments, the distance d is from 20 to 60 mm.

As previously discussed, the pivot tool (300) and the components thereof (e.g., base (310), handle(s) (320), pinhole component (333), hook extension (340), etc.) are not limited to the configurations shown and described herein. For example, in certain embodiments, the pivot tool (300) has a base (310) that is a handle, e.g., the base is used as the handle. In certain embodiments, the base and handle are the same piece.

As shown in FIG. 1D, the handles (320, 320a, 320b) may be offset at an angle with respect to the plane of the hook extension (340).

Referring to FIG. 2, the saddle reducers (400) comprise a base shaft (410) from which an engagement rod (420) extends. The engagement rod (420) is configured to engage pedicle screws, e.g., one, two, three, four, etc. pedicle screws.

In certain embodiments, the base shaft (410) resembles a shaft or rod. The engagement rod (420) may be disposed at the first end (411) (or near the first end) of the base shaft (410) as shown in FIG. 2. In certain embodiments, the engagement rod (420) may be positioned generally perpendicularly to the base shaft (410), e.g., such that the base shaft (410) and engagement rod (420) resemble a T-bar, e.g., as shown in FIG. 2, wherein the engagement rod (420) extends outwardly from the first end (411) (or near the first end) of the base shaft (410) in opposite directions. In some embodiments, the engagement bar (420) is evenly positioned with respect to the base shaft (410), e.g., the engagement bar (420) extends outwardly from the base shaft (410) equivalently in opposite directions. In certain embodiments, the engagement bar (420) is a straight rod. In certain embodiments, the engagement bar (420) has a curvature, e.g., the ends (421, 422) curve upwardly, e.g., away from the base shaft (410) or downwardly, e.g., for kyphosis. The present invention is not limited to the configurations shown or described herein.

Disposed on the bottom end of the base shaft (410) is an attachment component for attaching to the pivot tool (300). In some embodiments, the attachment component is a tulip head (430). The tulip head (430) may resemble the tulip screws found on the tops of pedicle screws. For example, the tulip head (430) features a pair of parallel tabs (431) that form a slot (432) for engaging an attachment component of the pivot tool (300). Disposed in both tabs (431) is a pinhole (434) for accepting a pin (440) or other component for attachment. The pin (440) prevents or allows access to the slot (432), for example for inserting or removing the attachment component of the pivot tool (300). In some embodiments, the pins (431) are aligned such that a pin (440) or engagement component can be inserted through both pinholes (434).

Figure 3:
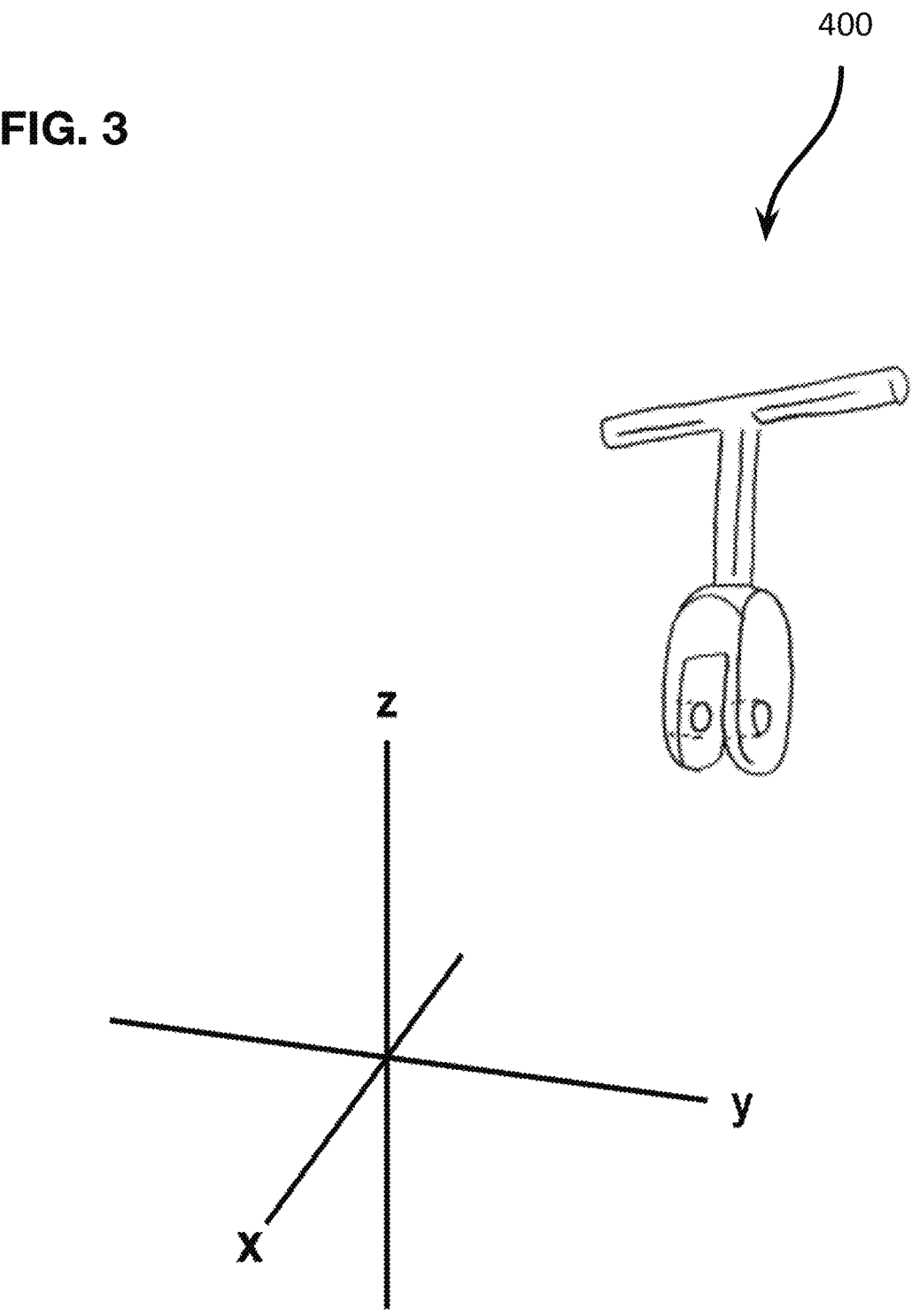
FIG. 3 shows a non-limiting example of the planar orientations of components of the saddle reducers.

In certain embodiments, the slot (432) of the tulip head (430) is oriented to be perpendicular to the base shaft (410). In some embodiments, the slot (432) is oriented to be perpendicular to the engagement rod (420). FIG. 3 shows an example of the x plane, y plane, and z plane. In certain embodiments, the saddle reducer (400) is configured such that the base shaft is oriented on the z plane, and the engagement bar (420) is oriented on the y plane. In some embodiments, the slot (432) of the tulip head (430) is oriented on the x plane. The present invention is not limited to this configuration, nor is the present invention limited to a tulip head (430) for engaging the attachment component of the pivot tool (300).

The saddle reducers (400) may be constructed in a variety of sizes. For example, in certain embodiments, the saddle reducer is 20 mm in length from the first end (421) of the engagement rod (420) to the second end (422). In certain embodiments, the saddle reducer is 55 mm in length from the first end (421) of the engagement rod (420) to the second end (422). In certain embodiments, the saddle reducer is 95 mm in length from the first end (421) of the engagement rod (420) to the second end (422). In certain embodiments, the saddle reducer is 115 mm in length from the first end (421) of the engagement rod (420) to the second end (422). In certain embodiments, the saddle reducer is 140 mm in length from the first end (421) of the engagement rod (420) to the second end (422). In certain embodiments, the saddle reducer is 150 mm in length from the first end (421) of the engagement rod (420) to the second end (422). The present invention is not limited to the aforementioned sizes. For example, in certain embodiments, the saddle reducer is from 20 to 80 mm in length from the first end (421) of the engagement rod (420) to the second end (422). In certain embodiments, the saddle reducer is from 50 to 100 mm in length from the first end (421) of the engagement rod (420) to the second end (422). In certain embodiments, the saddle reducer is from 90 to 130 mm in length from the first end (421) of the engagement rod (420) to the second end (422). In certain embodiments, the saddle reducer is from 100 to 150 mm in length from the first end (421) of the engagement rod (420) to the second end (422). In certain embodiments, the saddle reducer is from 100 to 160 mm or greater than 160 m in length from the first end (421) of the engagement rod (420) to the second end (422). The size may be chosen based on the number of vertebrae to engage. For example, in certain embodiments, a size of about 150 mm may be used for 5-6 vertebrae.

As previously discussed, the present invention is not limited to any of the sizes and configurations described or shown herein, and alternatives to the designs herein that achieve the desired function are within the scope of the present invention. For example, the present invention may feature hinges in the saddle reducer or alternative connection mechanisms between the saddle reducer and pivot tool.

Methods

Figure 4:
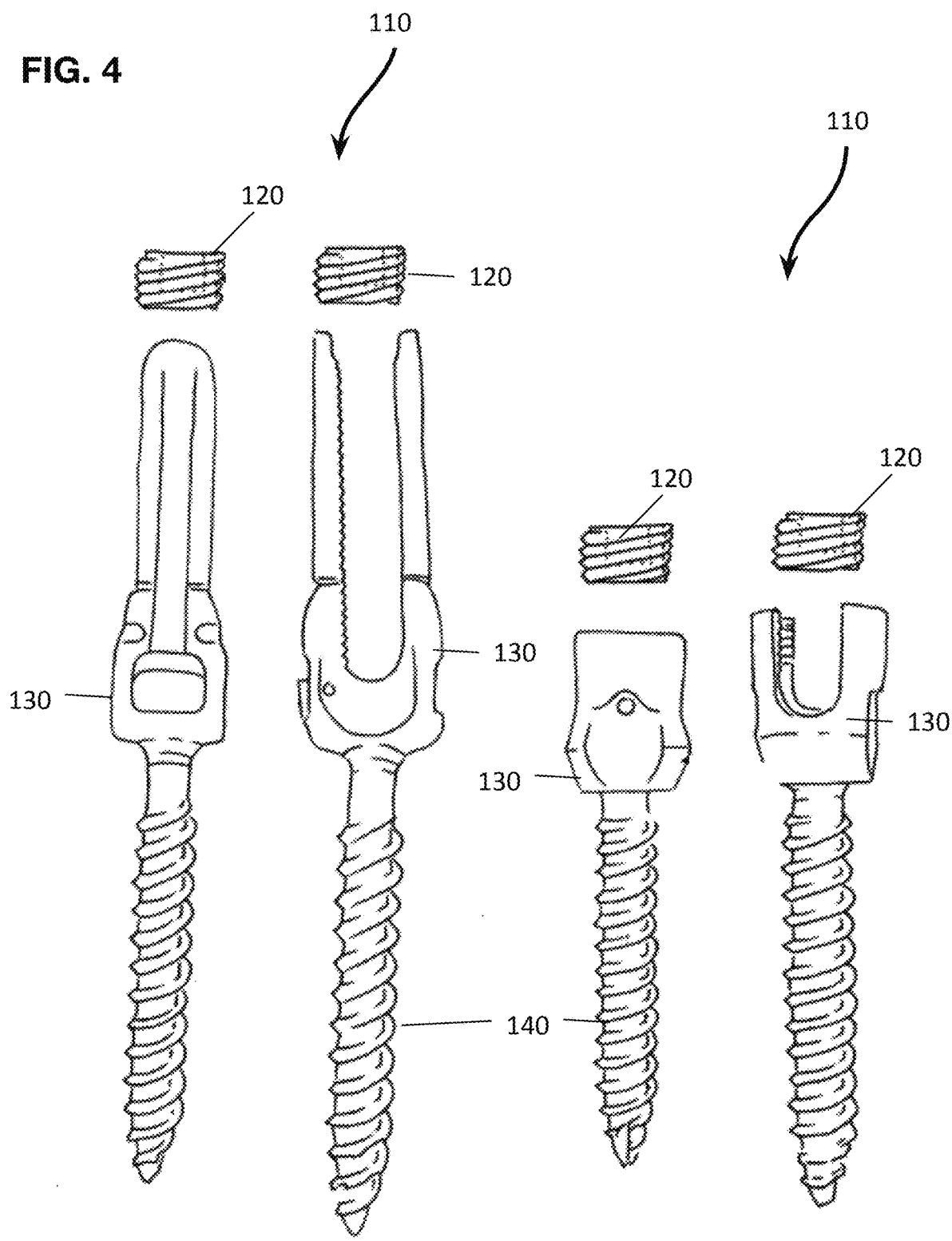
FIG. 4 shows examples of pedicle screws.

Prior to derotation of the spine, pedicle screws are implanted bilaterally in the appropriate vertebra, such as those vertebrae to which rotation forces will be applied during the derotation process. Pedicle screws are well known to one of ordinary skill in the art. See, for example, U.S. Pat. Nos. 6,743,237, 6,827,719, 6,652,526, and 6,375,657, the disclosures of which are incorporated herein by reference. Non-limiting examples of pedicle screws (110) are shown in FIG. 4. Generally, the pedicle screws (110) comprise a threaded shaft (140) extending below a screw head (130). Set caps (120) engage the screw head (130), e.g., via a threaded mechanism. The present invention is not limited to the pedicle screws disclosed herein.

Prior to derotation of the spine in the axial plane, the spine is derotated in the coronal and sagittal planes, e.g., using one or more rods. In some embodiments, a rod is captured within at least a portion of the pedicle screws. For example, as shown in FIG. 5A and FIG. 5B, a rod (210), e.g., a pre-bent rod, engages with a column of pedicle screws. In some embodiments, the rod is a precut and/or pre-contoured rod. In some embodiments, a rod is placed on the right side of the spine. In some embodiments, a rod is placed on the left side of the spine.

In some embodiments, e.g., as shown in FIG. 5A, a single rod is placed on the concave side of the deformity curve, e.g., at the apex of the main deformity curve. As an example, if a patient has a left side scoliosis deformity or curve, a prebent rod may be inserted into the pedicle screws of the right concave side of the scoliosis deformity and captured (but not tightened) by set caps.

Once the rod is appropriately captured by the pedicle screws, corrections to the deformities in the coronal and sagittal places can be made. For example, two or more rod holders may be clamped tightly onto the rod so as to rotate the rod in the opposite direction of the deformed scoliosis curve. This rotation of the properly prebent rod will correct the spine in the coronal and sagittal planes depending upon stiffness of the deformed scoliosis spine.

The methods herein, e.g., for correcting spinal deformities in the axial plane, feature the use of the pivot tool (300) and saddle reducers (400) as previously described.

Set caps of the pedicle screws in the vertebral bodies that need DVR correction (e.g., the set caps of pedicle screws that have captured the rod, e.g., on the concave side of the curve) remain untightened with respect to the rod. Set caps in pedicle screws in vertebral bodies that are neutral/normal and do not need DVR correction may be fully tightened on the main rod to maintain their current position.

In some embodiments, a surgeon hooks a pivot tool (300) onto the rod, e.g., a rod at the apex of a scoliosis concave curve. In certain embodiments, the hook (344) of the pivot tool (300) is secured to the rod (210) via the attachment sleeve (346). For example, the attachment sleeve (346) may move to the engaged position (e.g., slide down over the hook (344)) to secure pivot tool (300) to the rod (210).

An appropriate length saddle reducer (400) is selected. The size of the saddle reducer (400) may be selected to accommodate the number of vertebral segments that need to be derotated. In some embodiments, the saddle reducer (400) is placed in the heads of the pedicle screws on the contralateral or convex side of the spine curve. Set caps may be used to temporarily capture the saddle reducer (400) in the heads of the pedicle screws.

The pivot tool (300) is attached (secured) to the saddle reducer (400). For example, the pinhole (331) of the pivot tool (300) is aligned with the pinhole ((434) of the tulip head (430) of the saddle reducer and a pin (440) is engaged in the pinholes (331, 434) to secure the pivot tool (300) to the saddle reducer (400) and prevent detachment. The present invention is not limited to attaching the pivot tool (300) and saddle reducer (400) via pinholes and pins. Any appropriate temporary attachment mechanism may be considered.

In certain embodiments, pressure is then applied (e.g., medially) on the handle (320) of the pivot tool (300). In certain embodiments, this pressure (e.g., medial pressure) on the handle (320) of the pivot tool (300) causes the hook (344) of the pivot tool (300) attached to the rod (210) at the apex of the curve to pivot off of the rod (210), producing downward pressure on the convex pedicle screws where the saddle reducer (400) has been placed. In certain embodiments, this pressure (e.g., medial and downward pressure) on the handle (320) causes the convex side of the spine to pivot off the hook (344) of the pivot tool (300) and derotate the vertebral bodies and posterior segmental elements to a neutral or normal corrected position.

When the derotation has positioned the vertebral bodies and posterior elements in a normal or neutral position, the set caps of the appropriate pedicle screws may be tightened and/or torqued (with respect to the rod) to secure the spine in the corrected axial, coronal and sagittal plane.

Following derotation, the saddle reducer (400) and pivot tool (300) are disconnected, e.g., the pin (440) that secures the saddle reducer (400) and the pivot tool (300) together is removed. Then, the saddle reducer (400) is removed from the heads of the pedicle screws on the former convex side and the pivot tool (300) is removed from the rod (210), e.g., the attachment sleeve (436) moves to the disengaged position to allow the hook (344) to be removed from the rod (210).

Figure 6:
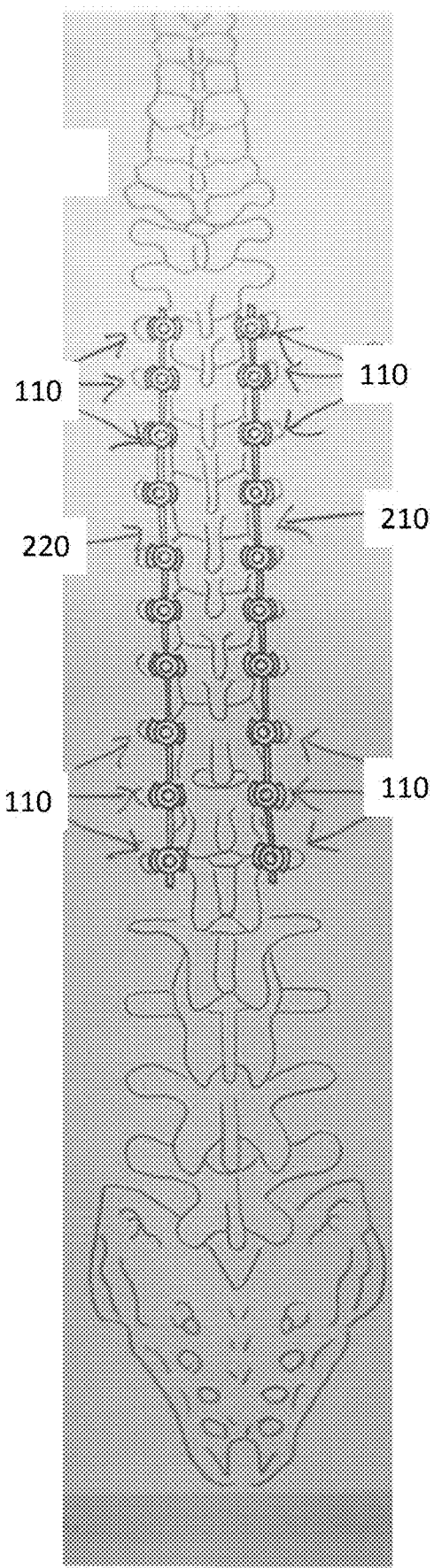
FIG. 6 shows an example of a corrected or ameliorated spine wherein following coronal, sagittal, and axial correction, a second rod is placed and secured to the pedicle screws opposite the main rod (e.g., the second rod is placed on the former convex side).

In certain embodiments, a second rod (220) is then placed into the heads of the pedicle screws of the former convex side of the corrected deformity (see FIG. 6). The rod is captured by the set caps and tightened and torqued to the appropriate specifications. The spine at this point has been corrected in the coronal, sagittal and axial plane.

Figure 7:
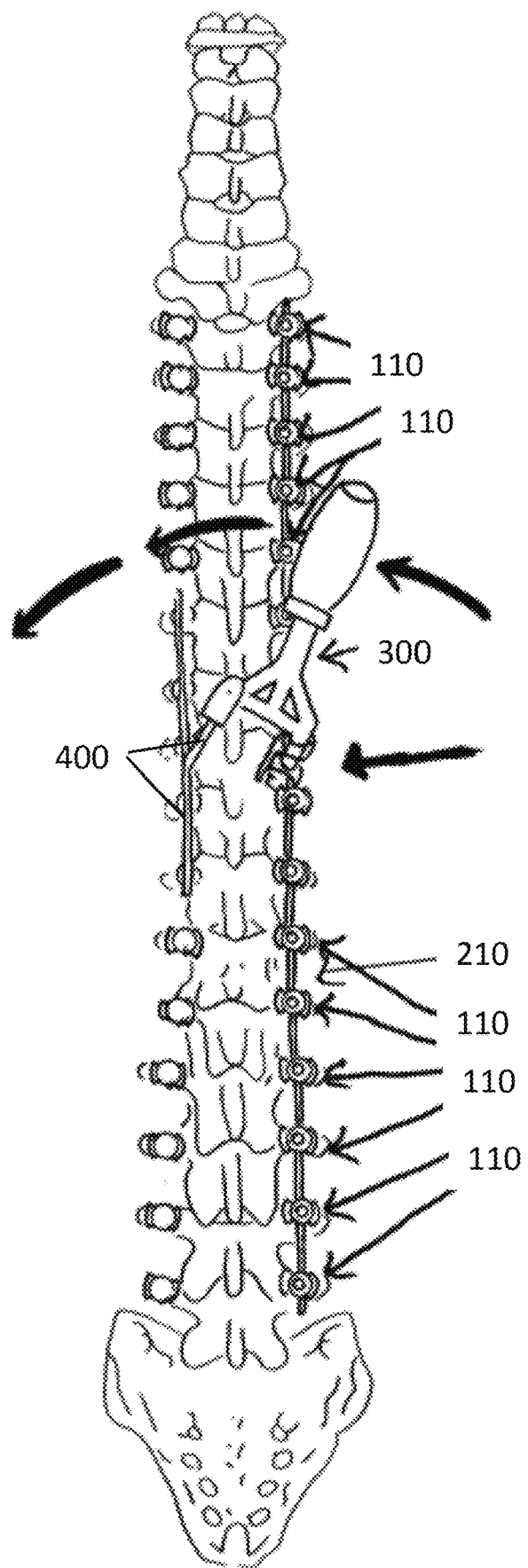
FIG. 7 shows an example of the use of a single system.

FIG. 7 shows a non-limiting example of the use of a saddle reducer (400) captured by 5 pedicle screws on the left side (opposite side of the permanent rod (210)), and a pivot tool (300) attached to the saddle reducer (400) in addition to the permanent rod (210) on the right side. FIG. 7 also illustrates a non-limiting example of rotational motion of the pivot tool.

Figure 8:
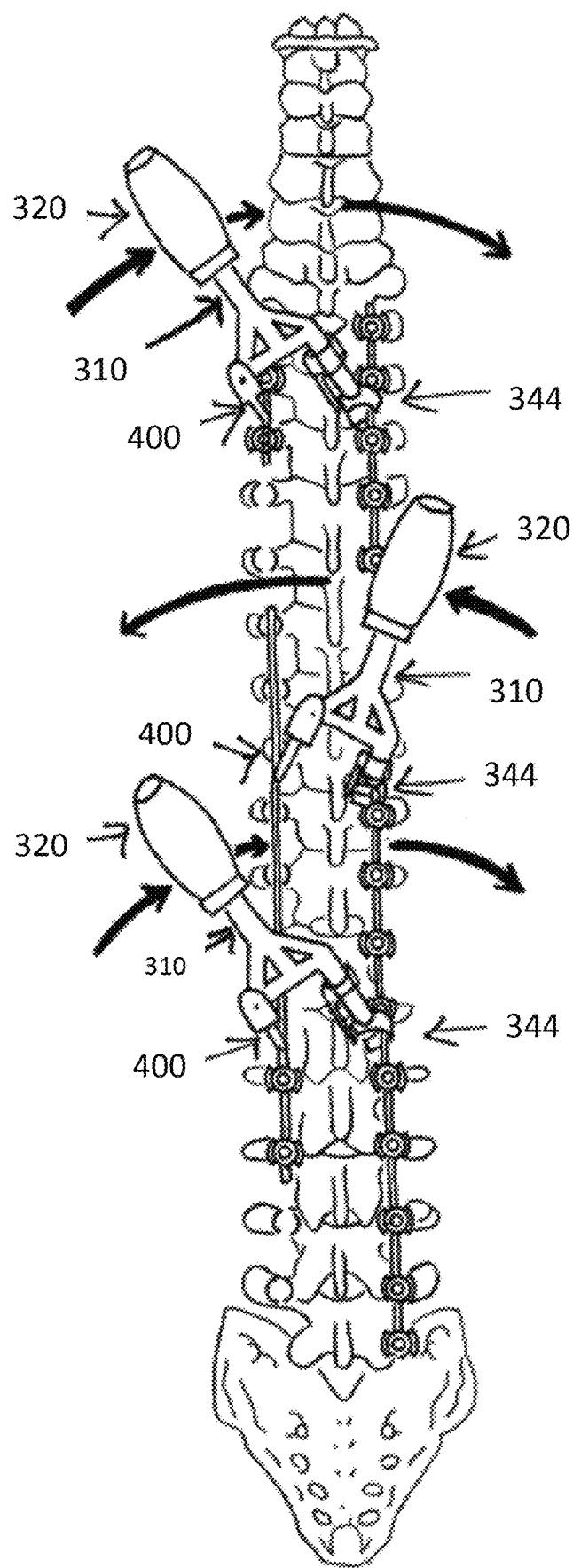
FIG. 8 shows an example of the use of three systems.
Figure 9A:
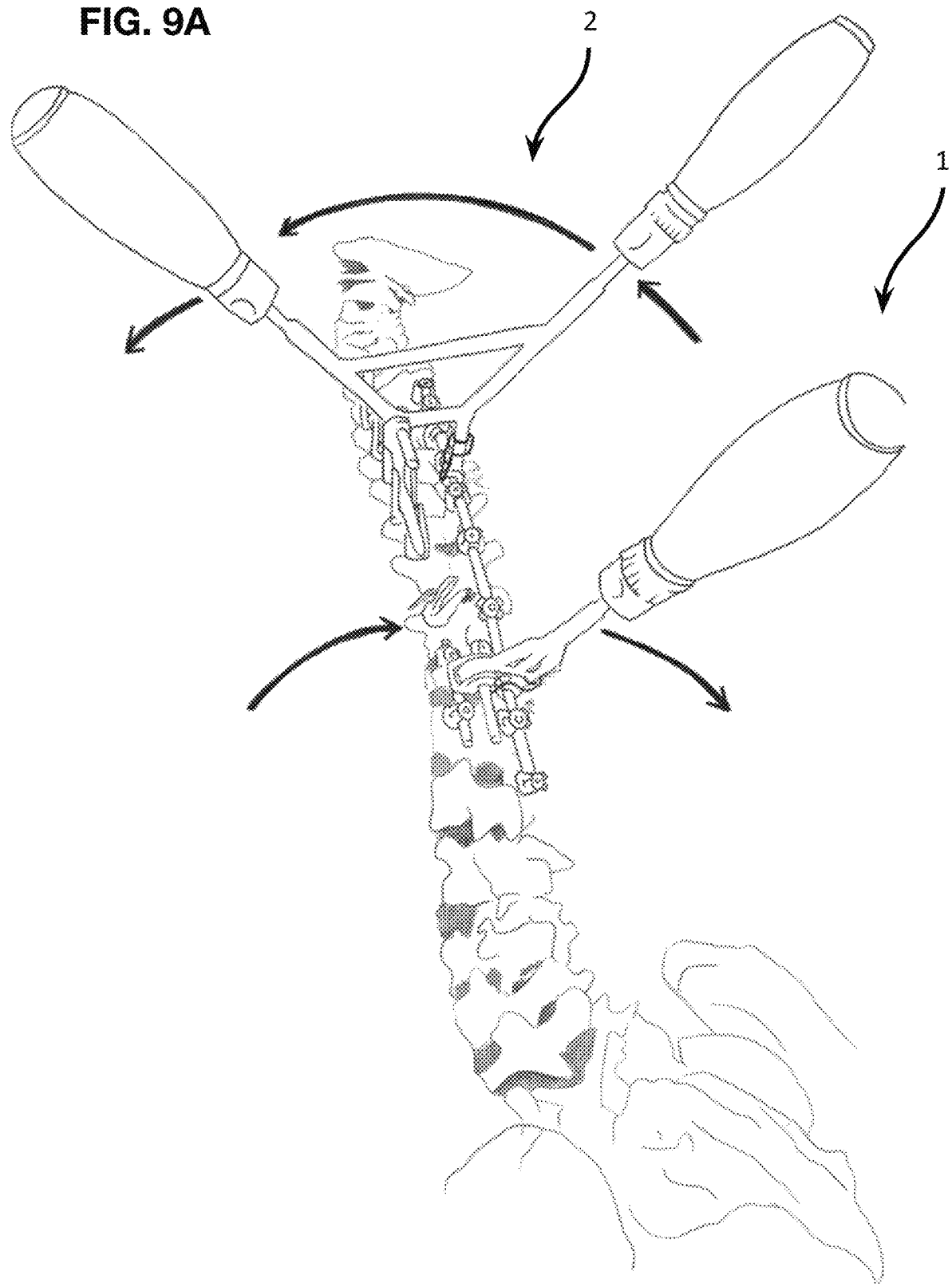
FIG. 9A and FIG. 9B show examples of the use of two systems.
Figure 9B:
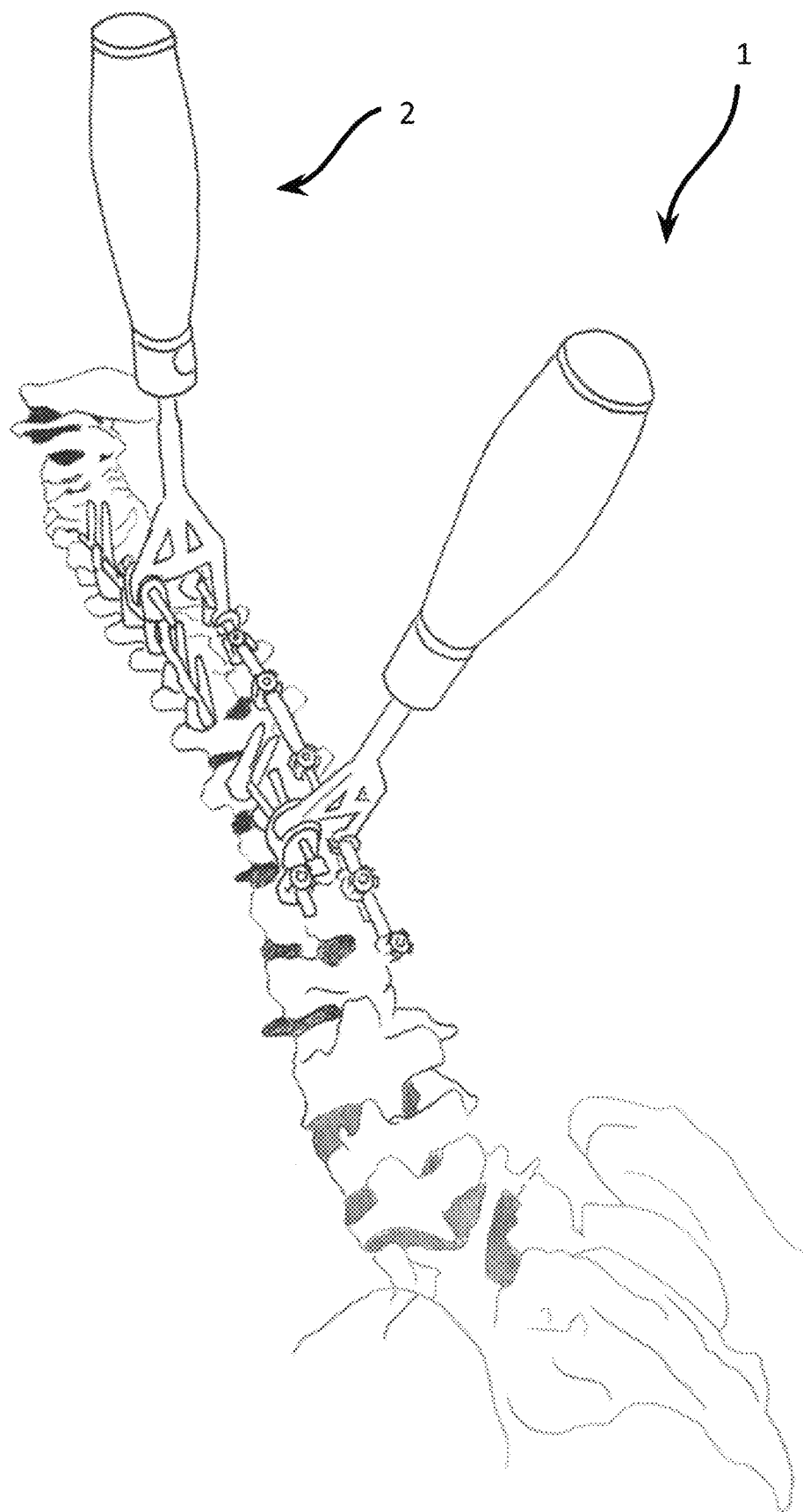

The present invention is not limited to the use of a single system, e.g., a single pivot tool (300) and a single saddle reducer (400). For example, FIG. 8 shows the use of three systems, e.g., three pivot tools (300) and three saddle reducers (400). FIG. 9A and FIG. 9B show the use of two systems, e.g., two pivot tools (300) and two saddle reducers (300). FIG. 7, FIG. 8, FIG. 9A, and FIG. 9B also illustrate non-limiting examples of rotational motion of the pivot tools. In some embodiments, one or more systems are used as counter torques.

In some embodiments, the method (e.g., wherein the pivot tool (300) is hooked and secured to the concave rod, the saddle reducer (400) is introduced to the pedicle screw heads of the convex curve, the pin is installed to join the pivot tool (300) to the saddle reducer (400), the derotation technique is performed, the set caps are used to lock the rod of the concave curve in the pedicle screw heads, and the pivot tool (300) is removed) may be performed in less than 10 minutes. In some embodiments, the method may be performed in less than 7 minutes. In some embodiments, the method may be performed in less than 5 minutes.

Discussion

It is an object of the present invention to provide improved systems and methods for correcting or ameliorating aberrant spinal column deviations by reducing the number of instruments needed to perform a DVR maneuver to correct a deformity in the axial plane as compared to systems currently used. For reference, other systems and methods may require at least four shafts and handles, e.g., 8 to 20 shafts and handles each individually attached to pedicle screw heads. Clamps or wrenches may be attached to the shafts and handles to create a cluster of shafts and handles connected to the screw heads. Two additional clamps or rails maybe attached transversely connecting the right cluster of screws and the left cluster of screws bilaterally, cephalad and caudal, to create an en bloc construct to perform the DVR axial correction maneuver by rotating or derotating the pedicle screws heads around two rods on both the right and left sides of the spine. Without wishing to limit the present invention to any theory or mechanism, it is believed that rotating or derotating the vertebral bodies off of bilateral rods delivers minimal correction in the axial plane because of two pivot points, right and left of the pedicle screw heads off of two bilateral rods.

It is an object of the present invention to provide an improved system of spinal instrumentation and method for the use thereof for correcting ameliorating aberrant spinal column deviation conditions by reducing the amount of time needed to perform the axial derotation, e.g., reducing the amount of time needed in the operating room to install instrument/s, derotate the axial deformity, lock down the set caps on the rod, and remove the derotation instrument. For reference, other systems and methods may require the installation of between four and 20 shafts and handles over the pedicle screw heads and up to four clamps or rails on the shafts and handles to create a cluster of screws bilaterally to derotate the spinal segments in the axial plane. Said steps, e.g., installing four to 20 shafts and handles over all the pedicle screw heads, installing the clamps or rails on the shafts with handles to create a cluster of pedicle screws to derotate, performing the derotation correction to neutral or normal, locking down the set caps on the rod, removing the clamps or rails, removing all the shafts with handles, etc., can take between 25-45 minutes for a surgeon to complete. As previously discussed, the methods herein may take a surgeon less than 10 minutes to complete.

It is an object of the present invention to provide universal systems and methods for correcting or ameliorating aberrant spinal column deviations, wherein the systems herein may be used with many (e.g., several, all, etc.) polyaxial, uniplanar or mono pedicle screw system currently available. For reference, other systems may be specific to each commercial company's individual brand or design of pedicle screw, e.g., individual companies generally manufacture and design pedicle screws that attach to specific shafts and handles. The methods and systems of the present invention provide for a more universal application. For example, the pivot tool (300) hooks on to the rod, e.g., the rod is positioned at the apex of the concave side of the spinal deformity, and a saddle reducer (400) is introduced and sits in the heads of the pedicle screws on the convex side of the deformity. The pivot tool (300) and saddle reducers (400) may be used with any (or nearly any) polyaxial tulip head pedicle screw system (see FIG. 4). The use of the universal polyaxial pedicle screw application may greatly reduce design and inventory cost since there would be no need to design and manufacture specific mono pedicle screws and/or uniplanar pedicle screws. This cost savings can be passed on to the hospitals, for example.

Further, without wishing to limit the present invention to any theory or mechanism, it is believed that the interface of the head of the polyaxial screw and the saddle reducer creates much less stress shielding of the pedicle screw placed into the pedicle bone than when using uniplanar pedicle screws or mono pedicle screws. Less stress shielding between the pedicle screw and pedicle bone helps reduce the possibility of bone screw loosening and helps reduce the chance of a pseudoarthrosis as the corrected spinal segments fuse together.

Note that the saddle reducers herein may be used with any type of pedicle screw. In some embodiments, the saddle reducer is used with polyaxial pedicle screws. In some embodiments, the saddle reducer is used with momo pedicle screws. In some embodiments, the saddle reducer is used with uniplanar pedicle screws.

It is an object of the present invention to provide systems and methods for correcting or ameliorating aberrant spinal column deviations with the ability to derotate in the axial plane a main thoracic, double thoracic, double major, triple major, thoracolumbar/Lumbar, a thoracolumbar/lumbar-Main thoracic scoliosis deformity, or the like. As previously discussed, in some embodiments, the pivot tool (300) is hooked onto the rod (210) (e.g., the rod placed at the apex of the concave curve) and secured onto the rod (210). An appropriate length saddle reducer (400) is selected, the length depending upon the number of vertebral segments that need to be derotated. The saddle reducer (400) is placed in the heads of the pedicle screws on the contralateral or convex side of the main curve, and the pivot tool (300) is attached to the saddle reducer (400) using an attachment means, e.g., a pin through the pinholes of both the pivot tool (300) and saddle reducer (400). Set caps that have captured the rod (210) on the concave side of the curve remain loose on the pedicle screws that need DVR correction. Set caps in pedicle screws that are neutral or normal and do not need DVR correction are fully tightened on the rod to maintain their current position. Medial pressure is then applied on the handle (320) of the pivot tool (300), causing the hook (344) on the concave rod (210) to pivot off of the concave rod, producing downward pressure on the convex pedicle screws where the temporary rod has been placed. This medial motion maneuver causes downward pressure on the pedicle screws on the convex side of the spine to pivot off the hook on the concave rod at the apex of the curve and derotate the vertebral bodies and posterior segmental elements to a neutral or normal position, thereby correcting or ameliorating the deformed spine in the axial plane (and in some embodiments completing the correction in the coronal and sagittal planes).

When a double thoracolumbar scoliosis deformity is present, two systems, e.g., a first system (1) and a second system (2), are connected or hooked onto the single concave rod (210), e.g., see FIG. 9A, FIG. 9B. The same general procedure for the single deformity is used. In addition, a second pivot tool (300) is attached or hooked onto the main rod (210) at the apex of the second curve, and a second saddle reducer (400) is chosen (for appropriate size) and inserted into the heads of the pedicle screws. The second pivot tool (300) and second saddle reducer (400) are secured together (e.g., via a pin or other attachment mechanism). In some embodiments, set caps are inserted into the pedicle screws heads and the set caps are not tightened but rather left slightly loose on the saddle reducer (400). The set caps in the pedicle screw heads on the main rod (210) also remain loose. Set caps in pedicle screws on the main rod that are neutral/normal and in the correct axial position and do not need axial correction may be fully tightened in the pedicle screw heads to secure the rod.

The handle(s) (320) of the second pivot tool (300) of the second system (2) can then have forces applied laterally in the opposite direction of the first handle(s) (320) of the first system (1) (see directional arrows of FIG. 9A, FIG. 9B), which causes the vertebral bodies and posterior elements to rotate off the hook (344) pivoting off the main rod (210) until the selected vertebral bodies and posterior elements are positioned into a neutral or normal position, achieving correction in the axial plane (which may additionally provide added correction in the coronal and sagittal planes).

The set caps on the pedicle screws of the main rod (210) are then tightened or torqued to hold the repositioned and corrected vertebral bodies and posterior elements of the second curve in the corrected position. The set caps that were loosely in the pedicle screws with the saddle reducer (400) are removed, the mechanisms holding the saddle reducers (400) and pivot tools (300) are disengaged (e.g., the pins are removed), the saddle reducers (400) both removed, and the hooks (344) of the pivot tools (300) are disengaged from the rod (210) to remove the pivot tools (300) (e.g., the attachment sleeves are moved to the disengaged position). A second permanent rod may then be measured for the appropriate length, cut to the appropriate length, bent appropriately (e.g., to reflect the appropriate lordosis and or kyphosis of the spine in the sagittal plane that mirrors the main rod that had been subjected to the axial correction), and inserted in the pedicle screw heads on the contralateral side of the main rod. The set caps may then be inserted into the pedicle screw heads and tightened and torqued to hold the corrected spine in place.

In some embodiments, a first system may be used as a counter torque to hold a selected number of vertebral bodies and posterior elements in place or static while a second system is derotating and correcting a group of vertebral bodies. In some embodiments a first system may be used as a counter torque to hold a selected number of vertebral bodies and posterior elements in place or static while a second system and third system are derotating and correcting a group of vertebral bodies.

It is an object of the present invention to provide improved systems and methods for correcting or ameliorating aberrant spinal column deviations with the ability to use three or more systems (e.g., see FIG. 8). As discussed above, e.g., with respect to a double thoracolumbar deformity, a first system (1) and a second system (2) are engaged or attached to the rod (210) and appropriate opposing pedicle screws in the appropriate positions. Then, a third pivot tool (300) is attached or hooked onto the rod (210) at the apex of a third curve, a third saddle reducer (400) is chosen and inserted into the heads of the pedicle screws, set caps are inserted into the pedicle screw heads to capture the third saddle reducer (400), and the third pivot tool (300) and the third saddle reducer (400) are connected.

In some embodiments, applying forces laterally to the handles (320) of two of the pivot tools (300) and applying medial forces to the remaining pivot tool (300) rotates and derotates the vertebral bodies and posterior elements until the selected vertebral bodies and posterior elements are positioned into a neutral or normal position.

Subsequently, as discussed above, the set caps on the pedicle screws of the main rod (210) are tightened and/or torqued to hold the repositioned and corrected vertebral bodies and posterior elements of the first, second, and third curves static in the corrected position. The set caps that were left loose on the saddle reducers (400) in the pedicle screws are then removed, the saddle reducers (400) and pivot tools (300) are disengaged from each other, and the pivot tools (300) are removed from the rod (210). A second permanent rod may then be measured for the appropriate length, cut to the appropriate length, bent appropriately (e.g., to reflect the appropriate lordosis and or kyphosis of the spine in the sagittal plane that mirrors the main rod that had been subjected to the axial correction), and inserted in the pedicle screw heads on the contralateral side of the main rod. The set caps may then be inserted into the pedicle screw heads and tightened and torqued to hold the corrected spine in place.

Embodiments of the present invention can be freely combined with each other if they are not mutually exclusive.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A derotation system for correcting a spinal deformity in at least an axial plane, said system comprising:
   a. a pivot tool (300) comprising a base (310) with a hook (344) disposed thereon in a first position and a first attachment component disposed thereon in a second position, the hook (344) comprising a C-shape such that the hook (344) is configured to temporarily attach to a rod (210) installed in a spine of a patient and apply rotational force to the rod (210);
   b. a saddle reducer (400) comprising an engagement rod (420) for temporarily engaging pedicle screws and a second attachment component extending from the engagement rod (420), wherein the pivot tool (300) and saddle reducer (400) can be temporarily connected together by engaging the first attachment component with the second attachment component; and
   c. a handle (320) extending from the base (310) of the pivot tool (300).

2. The system of claim 1, wherein the pivot tool comprises an attachment sleeve (346) for temporarily securing the hook (344) to a rod, wherein the attachment sleeve can move between an engaged position and a disengaged position.

3. The system of claim 1, wherein the hook (344) is connected to the base (310) via a hook extension (340).

4. The system of claim 1, wherein the first position of the base (310) and the second position of the base (310) are spaced a distance d apart.

5. The system of claim 1, wherein the first attachment component of the pivot tool (300) comprises a pinhole component (333) adapted to accept a pin.

6. The system of claim 1, wherein the second attachment component of the saddle reducer (400) comprises a pinhole component (333) adapted to accept a pin.

7. The system of claim 1, wherein the second attachment component of the saddle reducer (400) connects to the engagement rod (420) via a base shaft (410).

8. The system of claim 1, wherein the pivot tool (300) comprises a pinhole component (333) and the saddle reducer (400) comprises a pinhole (434), wherein the pinhole component (333) and the pinhole (434) can be secured together by a pin to connect the pivot tool (300) to the saddle reducer (400).

9. A derotation system for correcting a spinal deformity in at least an axial plane, said system comprising:
 a. a pivot tool (300) comprising a base (310) with a hook (344) disposed thereon in a first position and a first attachment component disposed thereon in a second position, the hook (344) comprising a C-shape such that the hook (344) is configured to temporarily attach to a rod (210) installed in a spine of a patient and apply rotational force to the rod (210);
 b. a saddle reducer (400) comprising an engagement rod (420) for temporarily engaging pedicle screws and a second attachment component extending from the engagement rod (420), wherein the pivot tool (300) and saddle reducer (400) can be temporarily connected together by engaging the first attachment component with the second attachment component; and
 c. two handles (320) extending from the base (310) of the pivot tool (300).

10. The system of claim 9, wherein the two handles (320) are at an angle with respect to each other.

11. The system of claim 9, wherein the pivot tool comprises an attachment sleeve (346) for temporarily securing the hook (344) to a rod, wherein the attachment sleeve can move between an engaged position and a disengaged position.

12. The system of claim 9, wherein the hook (344) is connected to the base (310) via a hook extension (340).

13. The system of claim 9, wherein the first position of the base (310) and the second position of the base (310) are spaced a distance d apart.

14. The system of claim 9, wherein the first attachment component of the pivot tool (300) comprises a pinhole component (333) adapted to accept a pin.

15. The system of claim 9, wherein the second attachment component of the saddle reducer (400) comprises a pinhole component (333) adapted to accept a pin.

16. The system of claim 9, wherein the second attachment component of the saddle reducer (400) connects to the engagement rod (420) via a base shaft (410).

17. The system of claim 9, wherein the pivot tool (300) comprises a pinhole component (333) and the saddle reducer (400) comprises a pinhole (434), wherein the pinhole component (333) and the pinhole (434) can be secured together by a pin to connect the pivot tool (300) to the saddle reducer (400).

* * * * *